US007278065B2

(12) United States Patent
Conkel

(10) Patent No.: US 7,278,065 B2
(45) Date of Patent: Oct. 2, 2007

(54) ENTERPRISE DIRECTORY SERVICE DOMAIN CONTROLLER REPLICATION ALERT AND REPAIR

(75) Inventor: Dale W. Conkel, Arlington, TX (US)

(73) Assignee: Electronic Data Systems Corporation, Plano, TX (US)

( * ) Notice: Subject to any disclaimer, the term of this patent is extended or adjusted under 35 U.S.C. 154(b) by 477 days.

(21) Appl. No.: 10/715,013

(22) Filed: Nov. 17, 2003

(65) Prior Publication Data

US 2005/0114401 A1 May 26, 2005

(51) Int. Cl.
G06F 11/00 (2006.01)
(52) U.S. Cl. .............................. 714/48; 714/4; 715/736
(58) Field of Classification Search .................. 714/48, 714/4; 715/734, 736
See application file for complete search history.

(56) References Cited

U.S. PATENT DOCUMENTS

| 5,774,645 | A | * | 6/1998 | Beaujard et al. ............... 714/25 |
| 5,968,121 | A | * | 10/1999 | Logan et al. ................ 709/219 |
| 6,249,883 | B1 | * | 6/2001 | Cassidy et al. ............... 714/42 |
| 6,498,612 | B1 | * | 12/2002 | Brown et al. ................ 715/762 |
| 6,751,674 | B1 | * | 6/2004 | Satagopan et al. .......... 709/249 |
| 6,850,253 | B1 | * | 2/2005 | Bazerman et al. .......... 715/734 |
| 6,915,309 | B1 | * | 7/2005 | Conley et al. ............ 707/104.1 |
| 6,993,675 | B2 | * | 1/2006 | Roddy et al. .................. 714/2 |
| 7,047,496 | B2 | * | 5/2006 | Nelles et al. ................ 715/736 |
| 2002/0024535 | A1 | * | 2/2002 | Ueno et al. .................. 345/736 |
| 2002/0099728 | A1 | * | 7/2002 | Lees et al. ................... 707/203 |
| 2003/0084146 | A1 | * | 5/2003 | Schilling et al. ............ 709/224 |
| 2003/0103077 | A1 | * | 6/2003 | Despotidis et al. .......... 345/734 |
| 2004/0176964 | A1 | * | 9/2004 | Ghaffar et al. .................. 705/1 |
| 2004/0220970 | A1 | * | 11/2004 | Wilson .................... 707/104.1 |
| 2005/0039132 | A1 | * | 2/2005 | Germain et al. ............ 715/736 |
| 2005/0044502 | A1 | * | 2/2005 | Fu ............................. 715/734 |
| 2005/0278385 | A1 | * | 12/2005 | Sutela et al. ................ 707/200 |
| 2006/0090136 | A1 | * | 4/2006 | Miller et al. ................ 715/734 |

* cited by examiner

Primary Examiner—Robert Beausoliel
Assistant Examiner—Christopher McCarthy
(74) Attorney, Agent, or Firm—Stephen R. Loe

(57) ABSTRACT

A method, system, and computer program product for monitoring and correcting directory service domain controller replication errors is provided. In one embodiment, a replication monitor queries the director service for replication information and determines whether an error exists. If an error is determined to exist, then the replication monitor consults a database of known error types and associated corrective actions to determine the appropriate corrective action. The appropriate corrective action is then performed. The replication monitor also visually displays information regarding the progress of the domain controller replication process, wherein the information includes the identity of domain controller replication partners and the status of the replication process between any two domain controller replication partners, including whether, for example, errors have been determined and whether corrective action is being or has been taken.

24 Claims, 5 Drawing Sheets

100
Network

ENTERPRISE DIRECTORY SERVICE DOMAIN CONTROLLER REPLICATION ALERT AND REPAIR

BACKGROUND OF THE INVENTION

1. Technical Field

The present invention relates generally to computer software and, more particularly, to directory replication in directory service environments.

2. Description of Related Art

A directory service is the main switchboard of a network operating system. It manages the identities of various distributed resources and manages the relationships between the various resources, thus allowing the various resources to work together. The directory service is also a place to store information about enterprise assets such as applications, files, printers, and users. A directory service further provides a consistent method for naming, describing, locating accessing, managing, and securing information about the resources.

Many software applications have directory service functionality built into their applications. However, these services are narrowly targeted directory services that often lack standards-based interfaces. This often results in one network containing multiple directories that do not work together and must be maintained separately. Maintaining disparate directory services such as this often translates into increased costs for the enterprise and requires greater management and more complex applications.

To overcome these disadvantages, enterprise-class directory services have been developed, such as, for example, Microsoft Windows 2000 Server Active Directory®, which is a product and registered trademark of the Microsoft Corporation of Redmond, Wash. An enterprise-class directory service is a consolidation point for isolating, migrating, centrally managing, and reducing the number of directories found in a network. Utilizing an enterprise-class directory service can simplify management, strengthen security, and increase interoperability.

Current methods to monitor the directory replication process in a directory service require significant human intervention in the monitoring process. For example to determine if replication is failing, currently event logs are scanned for errors and then monitoring personnel must page the directory service support person to fix the problem. For example, some enterprise-class director service software providers provide the tools to monitor replication, but it is typically mostly command line executable type diagnostic tools. These software providers have one tool that has to be run every hour at least by a monitoring person to see if replication is having any problems. To increase efficiency, it would therefore be desirable to have a method, computer program product, and system that can show replication partners replication links visually indicating the replication status and self correct any replication problems thereby freeing support personal for other problems.

SUMMARY OF THE INVENTION

The present invention provides a method, system, and computer program product for monitoring and correcting directory service domain controller replication errors. In one embodiment, a replication monitor queries the director service for replication information and determines whether an error exists. If an error is determined to exist, then the replication monitor consults a database of known error types and associated corrective actions to determine the appropriate corrective action. The appropriate corrective action is then performed. The replication monitor also visually displays information regarding the progress of the domain controller replication process, wherein the information includes the identity of domain controller replication partners and the status of the replication process between any two domain controller replication partners, including whether, for example, errors have been determined and whether corrective action is being or has been taken.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
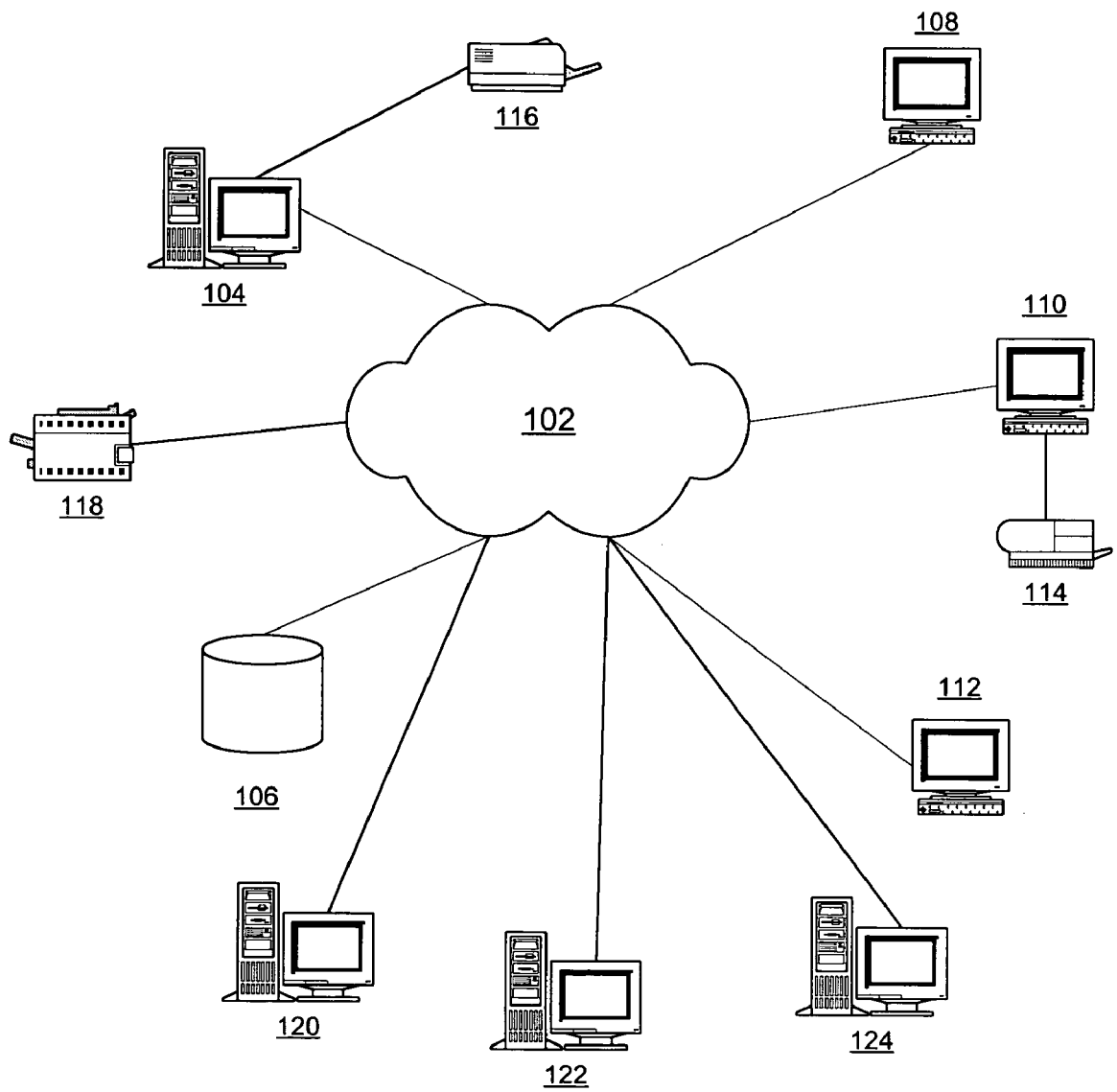
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 120, 122, and 124 are connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network.

In the depicted example, server 104 may provide data, such as boot files, operating system images and applications, to clients 108–112. Server 120 may be an e-mail server for users in network 100. Server 122 may provide access to the Internet and provides firewall and other security services. Server 124 may manage the enterprise-class directory service as well as provides directory service replication monitoring. Some or all of servers 104, 120, 122, and 124 may include one or more domain controllers (DCs). A DC is a server that authenticates domain logons and maintains the security policy and the master database for a domain. Servers 104, 120, 122, and 124 are physical servers whereas DCs are virtual servers. A domain is a collection of computers that share a common domain database and security policy. Each domain has a unique name. The enterprise-class directory service replication monitoring service will be discussed in more detail below.

Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements. Any one of clients 108, 110, and 112 may be used as a monitoring console by a directory services administrator to monitor information about the enterprise-class directory service replication process and allow entry of commands and data by the directory service administrator. A graphical user interface (GUI) providing the directory service administrator with information about the DC replication process and indicating problems may be displayed to the director service administrator on any one of clients 108–112. An example of such a GUI is provided in FIG. 4 and discussed below.

An enterprise-class directory service is a distributed directory service. Objects in the directory are distributed across the domain controllers in a forest, and all domain controllers in a domain can be updated directly. Replication is the process by which the changes that are made on one domain controller are synchronized with all other domain controllers in the domain or forest that store copies of the same information. Data integrity is maintained by tracking changes on each domain controller and updating other domain controllers in a systematic way. Typically, the enterprise-class directory service replication uses a connection topology that is created automatically, which makes optimal use of beneficial network connections and frees the administrators from having to make such decisions.

In the depicted example, distributed data processing system 100 is the Intranet, with network 102 representing an enterprise-wide collection of networks and gateways that use a set of protocols to communicate with one another. Distributed data processing system 100 also may be implemented as a number of different types of networks such as, for example, a wide area network or a local area network.

FIG. 1 is intended as an example and not as an architectural limitation for the processes of the present invention.

Figure 2:
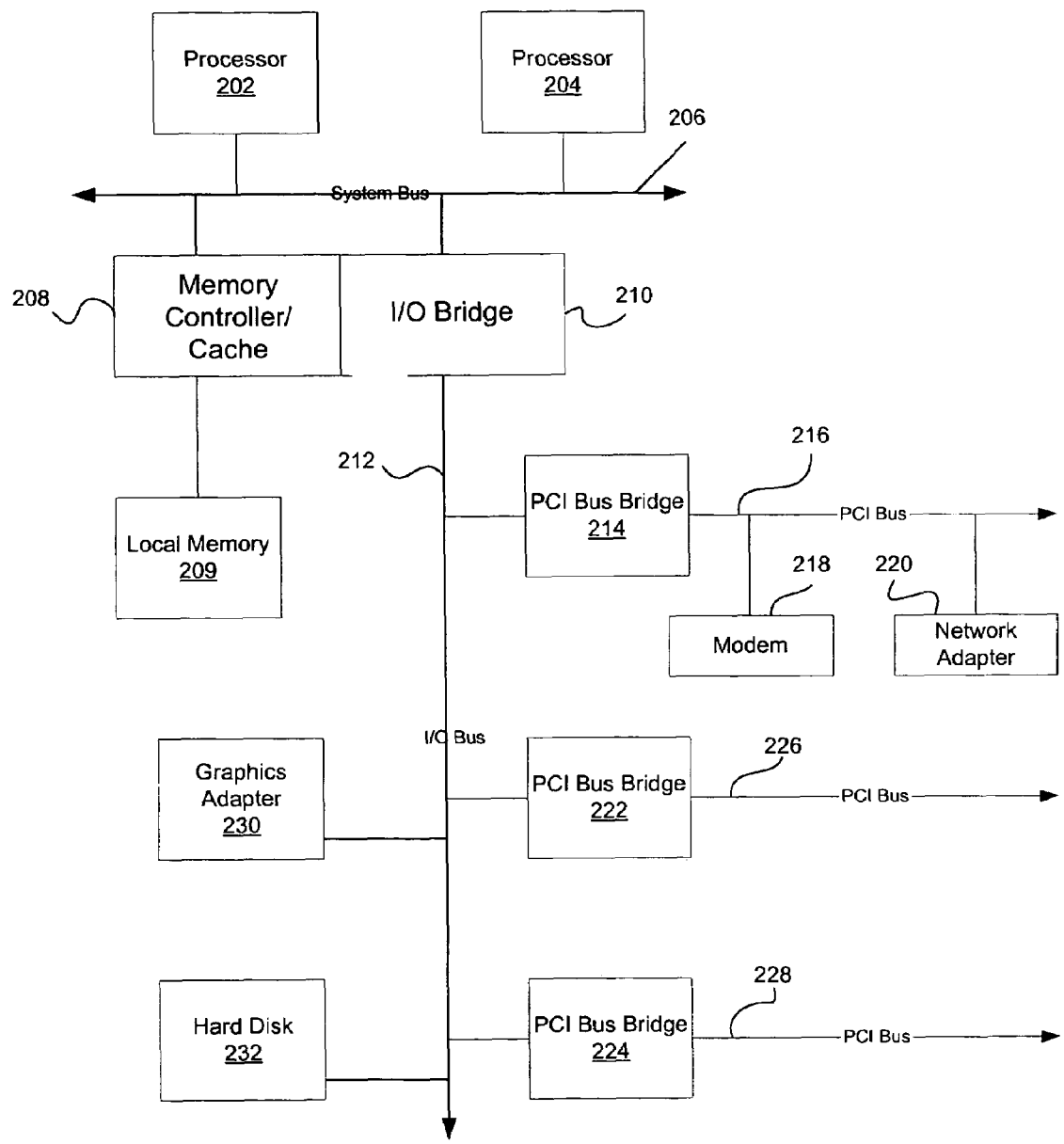
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

A directory service replication monitoring system may be implemented, at least in part, on server 200 as a set of computer readable instructions stored in local memory 209 and executed on at least one of processors 202 and 204. The replication monitoring system monitors the progress of the replication process, detects errors in the replication process, takes actions to solve the errors, and notifies an administrator if unable to solve the errors in the replication process. The replication monitoring system also presents a graphical view of the replication process to a user either locally, or at a remote data processing system, such as any one of clients 108–112 in FIG. 1. This graphical view provides the administrator with information as how the replication process is proceeding and indicates which, if any, replication processes are experiencing errors, and the nature of those errors.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Data processing system 200 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

Figure 3:
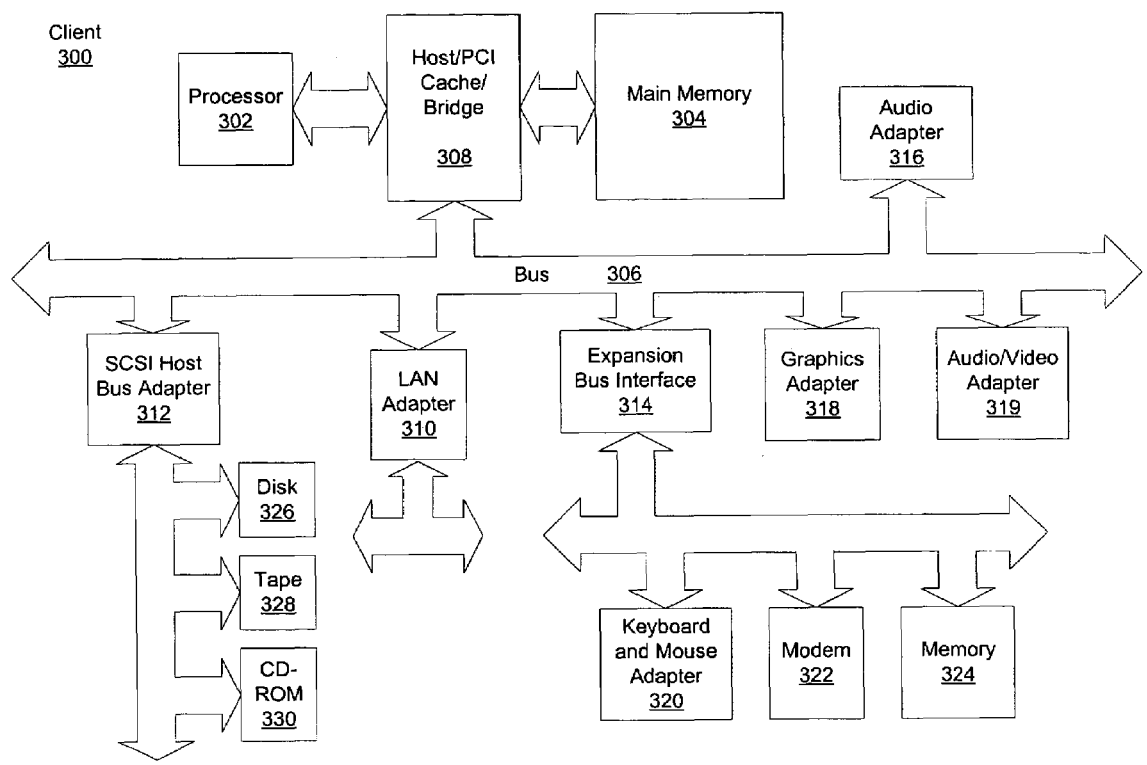
FIG. 3 depicts a block diagram of a data processing system in which the present invention may be implemented.

An operating system runs on processor 302 and is used to coordinate and provide control of various components within data processing system 300 in FIG. 3. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

The graphical representation of the replication process may be presented to an administrator through data processing system 300 by presenting graphical data to the user as indicated by the replication monitoring system located, for example, on server 200.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
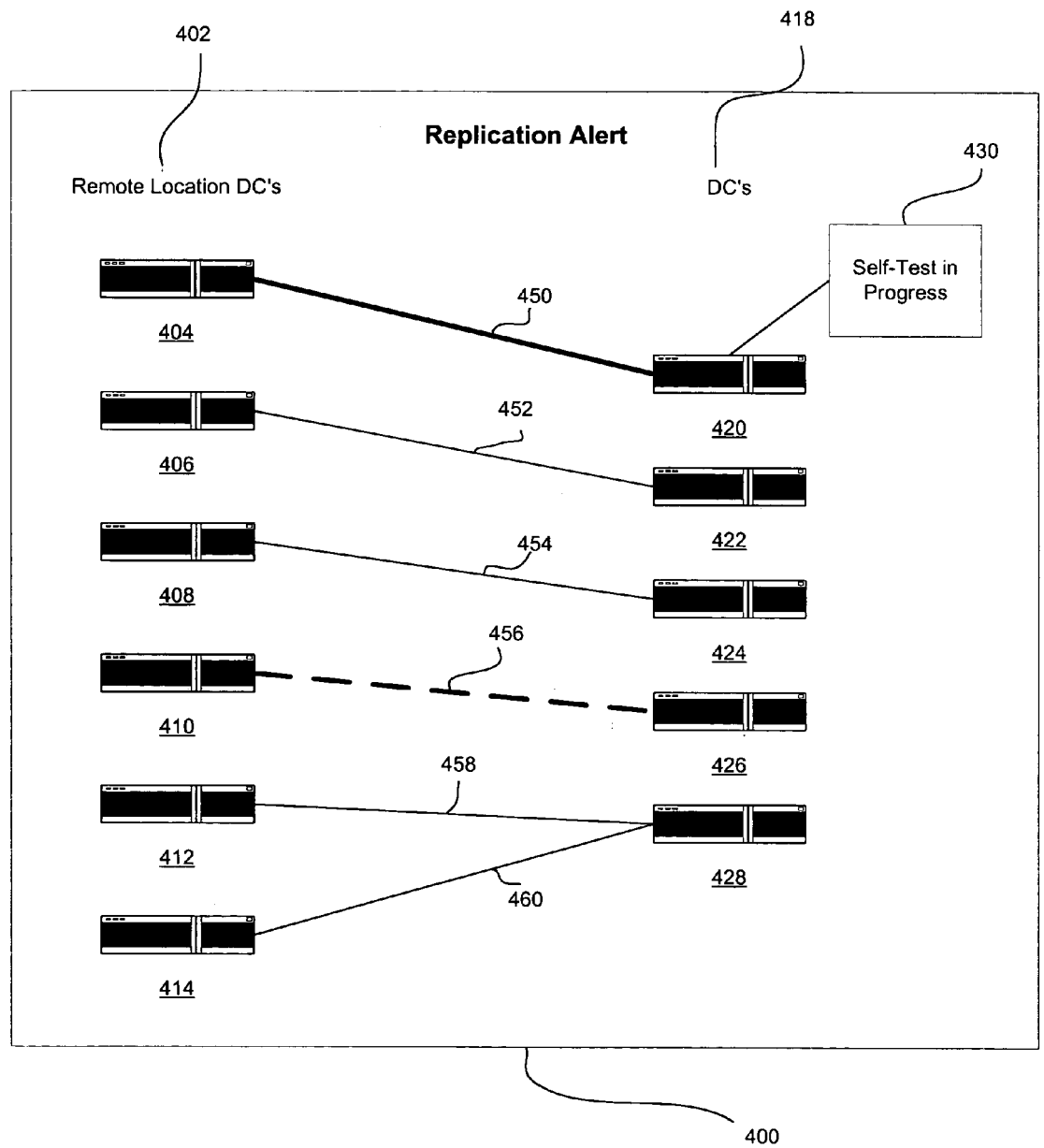
FIG. 4 depicts an exemplary display illustrating a graphical presentation of information about enterprise domain controller (DC) replication in accordance with one embodiment of the present invention.

With reference now to FIG. 4, an exemplary display illustrating a graphical presentation of information about enterprise domain controller (DC) replication is depicted in accordance with one embodiment of the present invention. In the depicted example, the Domain Controllers (DCs) within an enterprise are depicted graphically to an administrator as DC icons 404-414, 420-428 on Graphical User Interface (GUI) 400. Each of the DCs represented by DC icons 404-414 and 420-428 may be implemented on various ones of servers 104, 120, 122, and 124 in FIG. 1. The GUI 400 indicates the identity of each DC icon 404-414, 420-428 as either representing a remote location DC 402 or a local DC 418.

The relationship of the DC icons 404-414, 420-428 to each other are indicated, for example, with lines 450-460 which indicate which remote location DCs 402 replication partners of the local DCs 418. For example, DC represented by DC icon 420 is being replicated onto the DC represented by DC icon 404 and the DC represented by DC icon 422 is being replicated onto the DC represented by the DC icon 406. Differences in the appearance of the relationship identifiers 450-460 indicate the status of the replication process. For example, replication process 450 is depicted as a bold line and may indicate that there are serious errors associated with the replication of-the DC represented by DC icon 420 onto the DC represented by the DC icon 404. Replication process 456 is depicted as a bold dashed line indicating that there are minor errors or problems associated with the replication of the DC represented by the DC icon 426 onto the DC represented by DC icon 410. Replication processes that are proceeding normally with no errors may be indicated with an unbolded solid line, such as replication process indicators 452, 454, 458, and 460. In other embodiments, the nature of the replication process may be indicated by the color of the replication indicia 450-460 rather than the thickness and nature of the line itself, or by a combination of color and line thickness and nature. For example, serious error could be represented by red lines, minor errors could be represented by yellow lines, and replication procedures that are not experiencing any problems could be represented by green lines.

GUI 400 also may include text boxes 430 are other indications of the status of individual replication processes. For example, text box 430 indicates that a self-test is in progress for the replication errors associated with replicating the DC represented by DC icon 420 onto the DC represented by the DC icon 404. Thus, the administrator has an indication of what actions are currently being performed thereby allowing the administrator to determine if any other action needs to be taken.

In some embodiments, the various icons, relationship identifiers, and text boxes 404-460 may be selectable by a user and linked to other information relevant to the icon, indicia, or text box 404-460 allowing the user to gain more information about a specific area of the replication process not displayed in GUI 400. For example, if the user wished to have more information presented about the nature of the replication problem associated with the replication of the DC represented by DC icon 420 onto the DC represented by the DC icon 404, the user might select indicia 450, DC icon 420, or DC icon 404 in order to be presented with more information about the nature of the problem with this particular replication.

FIG. 4 is intended as an example of a graphical depiction of the progress of a replication procedure and not as a limitation for the processes of the present invention. Those skilled in the art will recognize many other manners in which to graphically or visually present the progress of the replication procedure.

Figure 5:
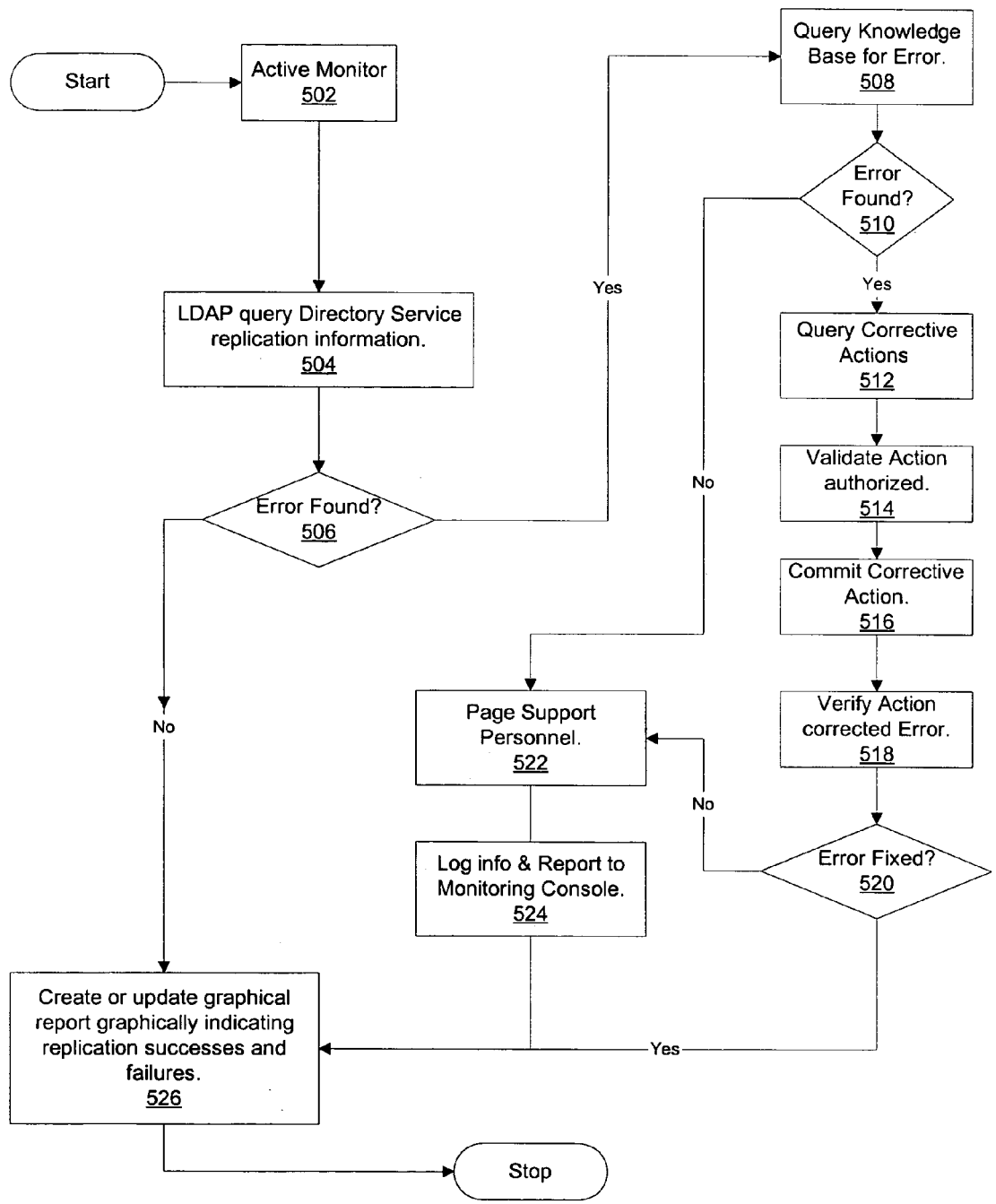
FIG. 5 depicts a program function and process flow for monitoring and correcting errors associated with replication of DCs in an enterprise-class directory service environment in accordance with one embodiment of the present invention.

With reference now to FIG. 5, a program function and process flow for monitoring and correcting errors associated with replication of DCs in an enterprise-class directory service environment is depicted in accordance with one embodiment of the present invention. To begin monitoring of a enterprise-class directory service replication process, the active replication monitor is engaged (step 502) which queries the enterprise-class directory service for replication information using, for example, the Lightweight Directory Access Protocol (LDAP), to gather information about the replication partners, last replication time, status, and error messages associated with any problems (step 504). The active replication monitor determines whether there are any errors associated with the replication processes (step 506). If an error is found, the active replication monitor then queries a knowledge base (step 508), located, for example, on database 106 in FIG. 1, to determine if an entry for the error type exists in the knowledge base (step 510). If the error type is not found in the knowledge base, then the active replication monitor pages support personnel (step 522) and logs information regarding the nature of the error and reports the information to a monitoring console, such as, for example, client 108 in FIG. 1. The monitor then proceeds to create or update a graphical or other visual report indicating the progress of the replication process or processes identifying, among other items, the successful and unsuccessful replication processes (step 526).

Returning to step 510, if the error type is found in the knowledge base, then the monitor queries the knowledge base for corrective actions to be taken to resolve the error (step 512) and verifies that the current conditions, such as time, identity of the DC partners, etc., authorize the identified the corrective actions to be implemented (step 514). If the corrective action is authorized, then the appropriate corrective actions are undertaken (step 516) and the monitor then verifies whether the corrective action or actions corrected the error (step 518). Thus, the monitor has artificial intelligence based on known problems that cause replication to fail through the knowledge base and attempts to fix the replication problems based on specific rules so as not threaten the network and enterprise-class directory service environment. As new types of problems and associated corrective actions are added to the knowledge database, the number of errors that can be automatically corrected by the monitor as opposed to errors submitted to personnel for correction increases, thereby increasing the efficiency of the enterprise.

If the monitor determines that the error has been fixed (step 520), then the monitor proceeds to create or update a graphical or other visual report indicating the progress of the replication processes (step 526). If the monitor determines that the error has not been fixed (step 520), then the monitor proceeds to page support personnel (step 522) and to log and report information to a monitoring console to be presented to an administrator (step 524).

The present invention corrects most replication failures without paging out to support personnel unless absolutely necessary. Thus, it frees up support personnel to be more productive and it allows monitoring personnel to escalate other problems.

The processes and flows depicted in FIG. 5 are intended merely as example processes and flows and not as an architectural limitation of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring replication of domain controllers and correcting problems with replication within a directory service environment, the method comprising:
    querying the directory service for replication information;
    determining whether an error exists based upon the replication information;
    correcting the error if an error exists; and
    visually displaying information regarding the progress of the domain controller replication process, wherein the information includes the identity of domain controller replication partners and the status of the replication process between any two domain controller replication partners.

2. The method as recited in claim 1, wherein correcting the error if an error exists comprises:
    consulting a knowledge base to determine whether an entry for an error type associated with the error exists in the knowledge base, wherein the knowledge base contains entries for error types and associated corrective actions; and
    taking corrective actions identified by the knowledge base as associated with the error type if the error type is found in the knowledge base.

3. The method as recited in claim 2, further comprising:
    prior to taking corrective action, determining whether the corrective action is authorized under conditions as currently exist in the director service environment.

4. The method as recited in claim 1, further comprising:
    paging support personnel if it is determined that the corrective action has failed to resolve the error.

5. The method as recited in claim 4, further comprising:
    logging information regarding the nature of the error, failed corrective action taken, and personnel paged.

6. The method as recited in claim 1, wherein the step of visually displaying information regarding the progress of the domain controller replication process comprises graphical indicia of relationships between domain controller partners.

7. The method as recited in claim 6, wherein the indicia comprises a line.

8. The method as recited in claim 7, wherein the nature of the progress and severity of any errors related to the replication process between domain controller replication partners is indicated by color wherein different colors represent different levels of errors and lack of errors.

9. A computer program product in a computer readable media for use in a data processing system for monitoring replication of domain controllers and correcting problems with replication within a directory service environment, the computer program product comprising:
    first instructions for querying the directory service for replication information;
    second instruction for determining whether an error exists based upon the replication information;
    third instructions for correcting the error if an error exists; and
    fourth instructions for visually displaying information regarding the progress of the domain controller replication process, wherein the information includes the identity of domain controller replication partners and the status of the replication process between any two domain controller replication partners.

10. The computer program product as recited in claim 9, wherein correcting the error if an error exists comprises:
    fifth instructions for consulting a knowledge base to determine whether an entry for an error type associated with the error exists in the knowledge base, wherein the knowledge base contains entries for error types and associated corrective actions; and
    sixth instructions for raking corrective actions identified by the knowledge base as associated with the error type if the error type is found in the knowledge base.

11. The computer program product as recited in claim 10, further comprising:

seventh instructions for determining whether the corrective action is authorized under conditions as currently exist in the director service environment prior to taking corrective action.

12. The computer program product as recited in claim 9, further comprising:
    fifth instructions for paging support personnel if it is determined that the corrective action has failed to resolve the error.

13. The computer program product as recited in claim 12, further comprising:
    sixth instructions for logging information regarding the nature of the error, failed corrective action taken, and personnel paged.

14. The computer program product as recited in claim 9, wherein the fourth instructions for visually displaying information regarding the progress of the domain controller replication process comprises graphical indicia of relationships between domain controller partners.

15. The computer program product as recited in claim 14, wherein the indicia comprises a line.

16. The computer program product as recited in claim 15, wherein the nature of the progress and severity of any errors related to the replication process between domain controller replication partners is indicated by color wherein different colors represent different levels of errors and lack of errors.

17. A system for monitoring replication of domain controllers and correcting problems with replication within a directory service environment, the system comprising:
    first means for querying the directory service for replication information;
    second means instruction for determining whether an error exists based upon the replication information;
    third means for correcting the error if an error exists; and
    fourth means for visually displaying information regarding the progress of the domain controller replication process, wherein the information includes the identity of domain controller replication partners and the status of the replication process between any two domain controller replication partners.

18. The system as recited in claim 17, wherein correcting the error if an error exists comprises:
    fifth means for consulting a knowledge base to determine whether an entry for an error type associated with the error exists in the knowledge base, wherein the knowledge base contains entries for error types and associated corrective actions; and
    sixth means for taking corrective actions identified by the knowledge base as associated with the error type if the error type is found in the knowledge base.

19. The system as recited in claim 18, further comprising:
    seventh means for determining whether the corrective action is authorized under conditions as currently exist in the director service environment prior to taking corrective action.

20. The system as recited in claim 17, further comprising:
    fifth means for paging support personnel if it is determined that the corrective action has failed to resolve the error.

21. The system as recited in claim 20, further comprising:
    sixth means for logging information regarding the nature of the error, failed corrective action taken, and personnel paged.

22. The system as recited in claim 17, wherein the fourth means for visually displaying information regarding the progress of the domain controller replication process comprises graphical indicia of relationships between domain controller partners.

23. The system as recited in claim 22, wherein the indicia comprises a line.

24. The system as recited in claim 23, wherein the nature of the progress and severity of any errors related to the replication process between domain controller replication partners is indicated by color wherein different colors represent different levels of errors and lack of errors.

* * * * *